US011315205B2

(12) United States Patent
Lu et al.

(10) Patent No.: US 11,315,205 B2
(45) Date of Patent: Apr. 26, 2022

(54) COMPUTERIZED SYSTEMS AND METHODS FOR FRAUD DETECTION AND USER ACCOUNT DEDUPLICATION

(71) Applicant: Coupang, Corp., Seoul (KR)

(72) Inventors: Xiao Lu, San Jose, CA (US); Yonghui Chen, San Diego, CA (US)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/884,394

(22) Filed: May 27, 2020

(65) Prior Publication Data

US 2021/0374890 A1 Dec. 2, 2021

(51) Int. Cl.
*G06Q 50/26* (2012.01)
*G06F 16/215* (2019.01)
*G06Q 30/00* (2012.01)

(52) U.S. Cl.
CPC ......... *G06Q 50/265* (2013.01); *G06F 16/215* (2019.01); *G06Q 30/0185* (2013.01)

(58) Field of Classification Search
CPC . G06Q 50/265; G06Q 30/0185; G06F 16/215
See application file for complete search history.

(56) References Cited

U.S. PATENT DOCUMENTS

| | | | | |
|---|---|---|---|---|
| 7,725,421 | B1 * | 5/2010 | Gedalius | G06Q 40/02 707/702 |
| 2004/0225865 | A1 * | 11/2004 | Cox | G06F 16/2455 712/34 |
| 2009/0249436 | A1 * | 10/2009 | Coles | G06F 21/6227 726/1 |

(Continued)

FOREIGN PATENT DOCUMENTS

| | | |
|---|---|---|
| JP | 2006-202196 | 8/2006 |
| JP | 2017-156993 | 9/2017 |

(Continued)

OTHER PUBLICATIONS

Preliminary Search Report dated Aug. 25, 2020, related to Korean Application No. KR 10-2020-0083580, 13 pages.
Notice of Preliminary Rejection dated Nov. 25, 2020, by the Korean Patent Office in Korean Application No. 10-2020-0083580, 11 pages.

(Continued)

*Primary Examiner* — Andrew B Whitaker
*Assistant Examiner* — Shaun D Sensenig
(74) *Attorney, Agent, or Firm* — Finnegan, Henderson, Farabow, Garrett & Dunner, LLP

(57) ABSTRACT

Systems and method are provided for fraud detection and user account deduplication. One method includes receiving a request from a user to register a third user account; receiving user information associated with the third user account, wherein the user information comprises a second attribute; at a third time entry, modifying the first data store by: searching the plurality of first entries in the first data store; comparing the second attribute to the first attribute of each first entry; determining that at least one first entry comprises a first attribute that is identical to the second attribute; adding second and third entries, wherein the second entry comprises the first and third user accounts, the second attribute, and the first and third time entries; and the third entry comprises the second and third user accounts, the second attribute, and the second and third time entries.

14 Claims, 10 Drawing Sheets

(56) References Cited

U.S. PATENT DOCUMENTS

| | | | |
|---|---|---|---|
| 2013/0091052 A1* | 4/2013 | Kaperdal | G06Q 20/405 |
| | | | 705/39 |
| 2016/0342999 A1* | 11/2016 | Routson | G06Q 30/02 |
| 2018/0060379 A1 | 3/2018 | Harrod et al. | |
| 2020/0004507 A1 | 1/2020 | Barday et al. | |
| 2020/0065814 A1* | 2/2020 | Fang | G06Q 20/4014 |

FOREIGN PATENT DOCUMENTS

| | | |
|---|---|---|
| JP | 6518378 | 5/2019 |
| KR | 10-2011-0013826 | 2/2011 |
| KR | 10-2015-0053701 | 5/2015 |
| TW | I465950 | 12/2014 |

OTHER PUBLICATIONS

International Search Report and Written Opinion dated Apr. 8, 2021 in corresponding PCT International Application No. PCT/IB2020/062567, 9 pages.

Office Action dated Jul. 7, 2021, by the Taiwanese Patent Office in counterpart Taiwanese Application No. 110100012, 36 pages.

Notice of Preliminary Rejection issued by the Korean Paten Office dated Mar. 1, 2022. in related Application No. KR 10-2021-0090926, 12 pages.

\* cited by examiner

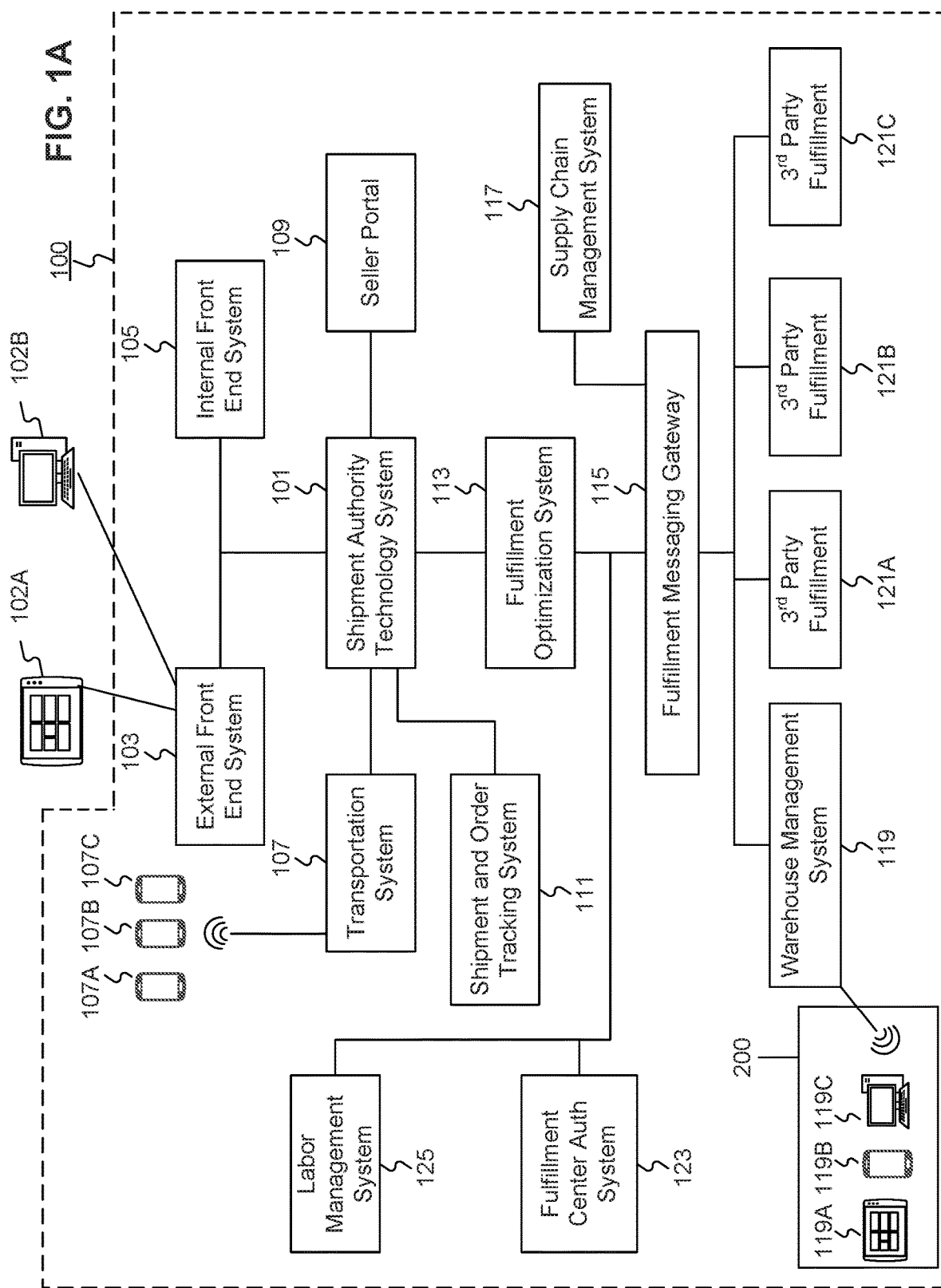

COMPUTERIZED SYSTEMS AND METHODS FOR FRAUD DETECTION AND USER ACCOUNT DEDUPLICATION

TECHNICAL FIELD

The present disclosure generally relates to computerized systems and methods for fraud detection and user account deduplication. In particular, embodiments of the present disclosure relate to inventive and unconventional systems that may register a new user account using a low computation load by searching entries in an initialized data store and modifying the data store by incrementally adding new entries for each newly registered user account.

BACKGROUND

Many organizations, such as businesses, offer consumers an online platform to interact with the organization. These online platforms often allow a consumer to register a user account to interact with the organization. For example, a business may allow consumers to register user accounts that include user profiles and allow users to purchase or monitor products for sale online.

Many consumers prefer a simple registration process to register their user accounts. However, typical registration processes are often difficult to control for user account abuse (e.g., fraud, misinformation, censored content) since a banned user may simply register a new account to continue illicit activities, thereby harming organizations and other users. For example, some special interest groups rely on social media to spread misinformation. A typical registration process may allow a user who spreads misinformation to be banned, but this same process may not be able to prohibit the banned user from registering a new user account using their same personal information (e.g., mobile phone number, email address, home address, etc.). This problem may be exacerbated by an increased number of user accounts. Furthermore, manually searching through each user account to identify the fraudulent user accounts is often difficult and time-consuming for the organization.

Furthermore, duplicate accounts may result in unexpected losses to an organization. For example, an online shopper may register multiple bot accounts to repeatedly take advantage of a promotion deal. A seller may register multiple accounts to take advantage of promotion incentives or to boost product rankings. These abuses may quickly exhaust an organization's campaign budget and result in the campaign missing a majority of the intended audience.

The quality of an organization's online platform and, consequently, a consumer's user experience are severely reduced when the online platform includes fraudulent users with duplicate accounts. The quality of an organization's online platform would be significantly improved if the online platform automatically detected duplicate accounts, identified the fraudulent users that should be banned, and permanently removed the user accounts of the fraudulent users.

Therefore, there is a need for improved systems and methods for fraud detection and user account deduplication that are scalable, automatic, and accurate.

SUMMARY

One aspect of the present disclosure is directed to a system for fraud detection and user account deduplication. The system may include a first data store comprising a plurality of first entries, wherein each first entry comprises a pair of first and second user accounts, at least one first attribute that is shared between the pair of first and second user accounts, and first and second time entries; a memory storing instructions; and at least one processor configured to execute instructions. The instructions may include receiving a request from a user to register a third user account; receiving user information associated with the third user account, wherein the user information comprises a second attribute; at a third time entry, modifying the first data store by: searching the plurality of first entries in the first data store; comparing the second attribute to the first attribute of each first entry; determining that at least one first entry comprises a first attribute that is identical to the second attribute; adding second and third entries, wherein the second entry comprises the first and third user accounts, the second attribute, and the first and third time entries; and the third entry comprises the second and third user accounts, the second attribute, and the second and third time entries; based on the second attribute, assign a registration status to the third user account; and sending a notification to the user indicating the registration status of the third user account.

Another aspect of the present disclosure is directed to a method for fraud detection and user account deduplication. The method may include a first data store comprising a plurality of first entries, wherein each first entry comprises a pair of first and second user accounts, at least one first attribute that is shared between the pair of first and second user accounts, and first and second time entries. The method may include receiving a request from a user to register a third user account; receiving user information associated with the third user account, wherein the user information comprises a second attribute; at a third time entry, modifying the first data store by: searching the plurality of first entries in the first data store; comparing the second attribute to the first attribute of each first entry; determining that at least one first entry comprises a first attribute that is identical to the second attribute; adding second and third entries, wherein the second entry comprises the first and third user accounts, the second attribute, and the first and third time entries; and the third entry comprises the second and third user accounts, the second attribute, and the second and third time entries; based on the second attribute, assign a registration status to the third user account; and sending a notification to the user indicating the registration status of the third user account.

Yet another aspect of the present disclosure is directed to a system for fraud detection and user account deduplication. The system may include a first data store comprising a plurality of first entries, wherein each first entry comprises a pair of first and second user accounts, at least one first attribute that is shared between the pair of first and second user accounts, and first and second time entries; a memory storing instructions; and at least one processor configured to execute instructions. The instructions may include receiving a request from a user to register a third user account; receiving user information associated with the third user account, wherein the user information comprises a second attribute; at a third time entry, modifying the first data store by: searching the plurality of first entries in the first data store; comparing the second attribute to the first attribute of each first entry; determining that at least one first entry comprises a first attribute that is identical to the second attribute; adding second and third entries, wherein the second entry comprises the first and third user accounts, the second attribute, and the first and third time entries; and the third entry comprises the second and third user accounts, the second attribute, and the second and third time entries. The instructions may further include categorizing the first and second attributes into first and second types of attributes; based on the first type of attribute, determining that the third user account is registered; based on the second type of attribute, determining that the third user account is not registered; and based on the second attribute, assigning a registration status to the third user account; and sending a notification to the user indicating the registration status of the third user account.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for fraud detection and user account deduplication. The disclosed embodiments are capable of registering new user accounts using a low computation load. For example, users (e.g., internal users or employees of an organization that owns, operates, or leases the disclosed systems) may submit a request to initialize databases via an internal front end system. A system may initialize a database by searching a plurality of edits in the database. Each edit may include, for example, a user account identifier, at least one attribute, and a time entry. The user account identifier may be associated with a registered user account. An attribute may include, for example, a name, address, telephone number, e-mail address, Internet Protocol (IP) address, computer identifier, social security number, birthday, or credit card information associated with a user. A time entry may include, for example, the time (e.g., month, day, year, hour, minutes, seconds, etc.) at which the associated user account was registered to the system. For each edit, the system may identify an attribute and identify pairs of edits that share the attribute. For each pair of edits that share an attribute, the system may create an entry that may be stored in the database. Each entry stored in the database may include, for example, a pair of user account identifiers, an attribute that is shared by the pair of user account identifiers, and a pair of time entries associated with the user accounts. A plurality of entries may be created for pairs of edits that share more than one attribute. For example, if a pair of user accounts shares three attributes, then three different entries may be created, one entry for each of the attributes.

In some embodiments, users (e.g., consumers) may submit a request to register a user account via an external front end system, which may be implemented as a web server that receives requests to register user accounts, search requests, presents item pages, and solicits payment information. The information entered by the users may include at least one attribute (e.g., name, address, telephone number, e-mail address, IP address, computer identifier, social security number, birthday, or credit card information associated with a user). A system may assign a category to the attributes. For example, the system may assign a first category to an attribute if the attribute comprises a telephone number, e-mail address, IP address, computer identifier, social security number, or credit card information. The system may assign a second category to an attribute if the attribute comprises a user's name, a user's address, or a birthday.

The system may search indexed databases based on the information received from the users. Because the databases are already indexed, the system may identify and retrieve entries that include attributes that match the attributes received from the users. For example, the databases may be initialized at a first time and the indexed databases may be searched at a second time after the first time. If the attributes of the retrieved entries from the databases include at least one attribute of a first category (e.g., telephone number, e-mail address, IP address, computer identifier, social security number, or credit card information), then the system may determine that the request to register a user account is a duplicate user account and deny the request. If the attributes of the retrieved entries from the databases include a second category (e.g., user's name, a user's address, or a birthday), but no attributes of the first category, then the system may determine that the request to register a user account is an authentic request to register a new user account and approve the request.

The databases may be initialized at a first time and the indexed databases may be searched at a second time after the first time. The databases may only be initialized once so that subsequent requests to register user accounts may be processed with a low computation load. For example, the initialized databases may require a quadratic complexity while processing each request after initialization may only require a linear complexity since the approved requests received after initialization may be added to the databases without re-indexing the existing entries in the databases.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
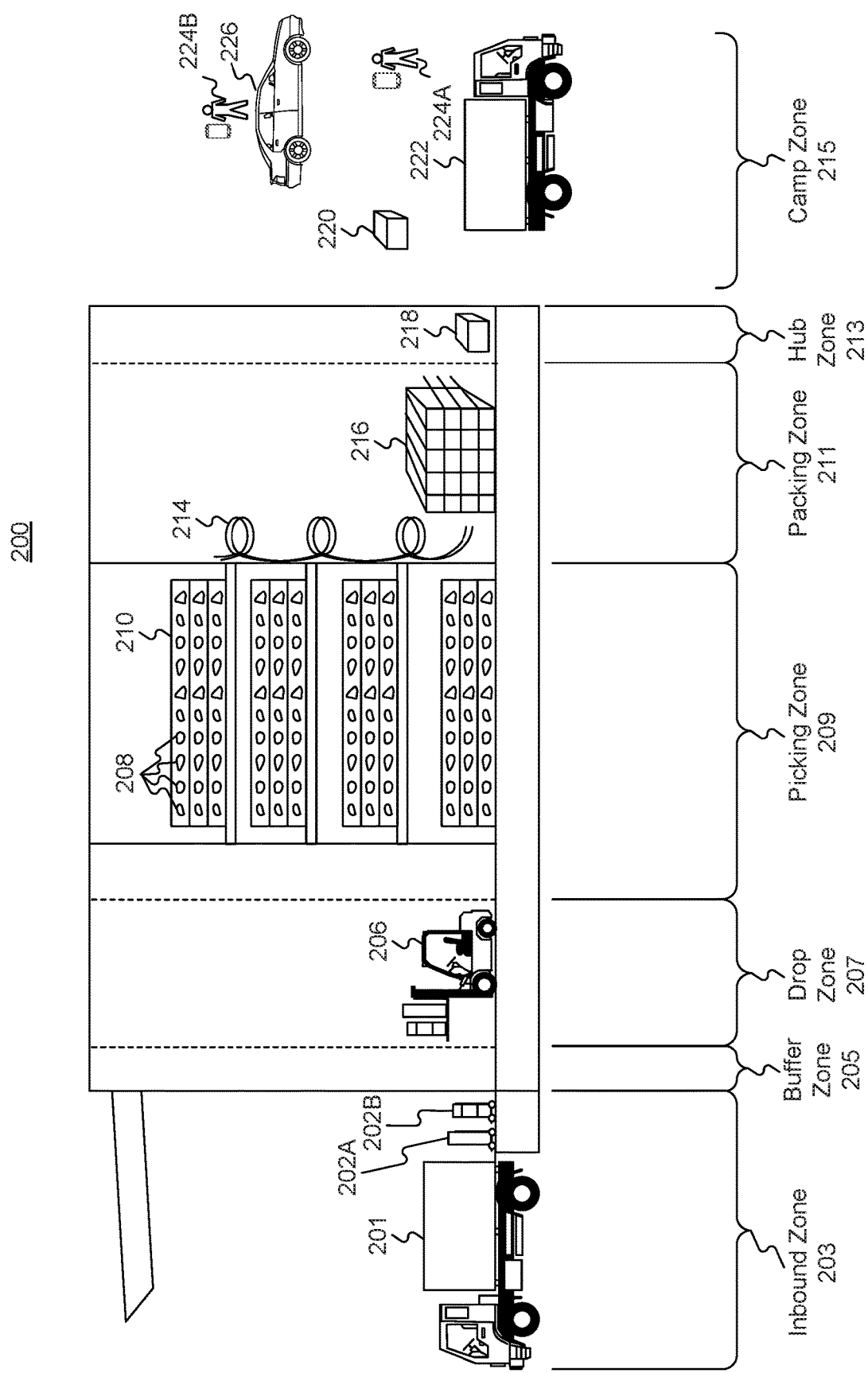
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
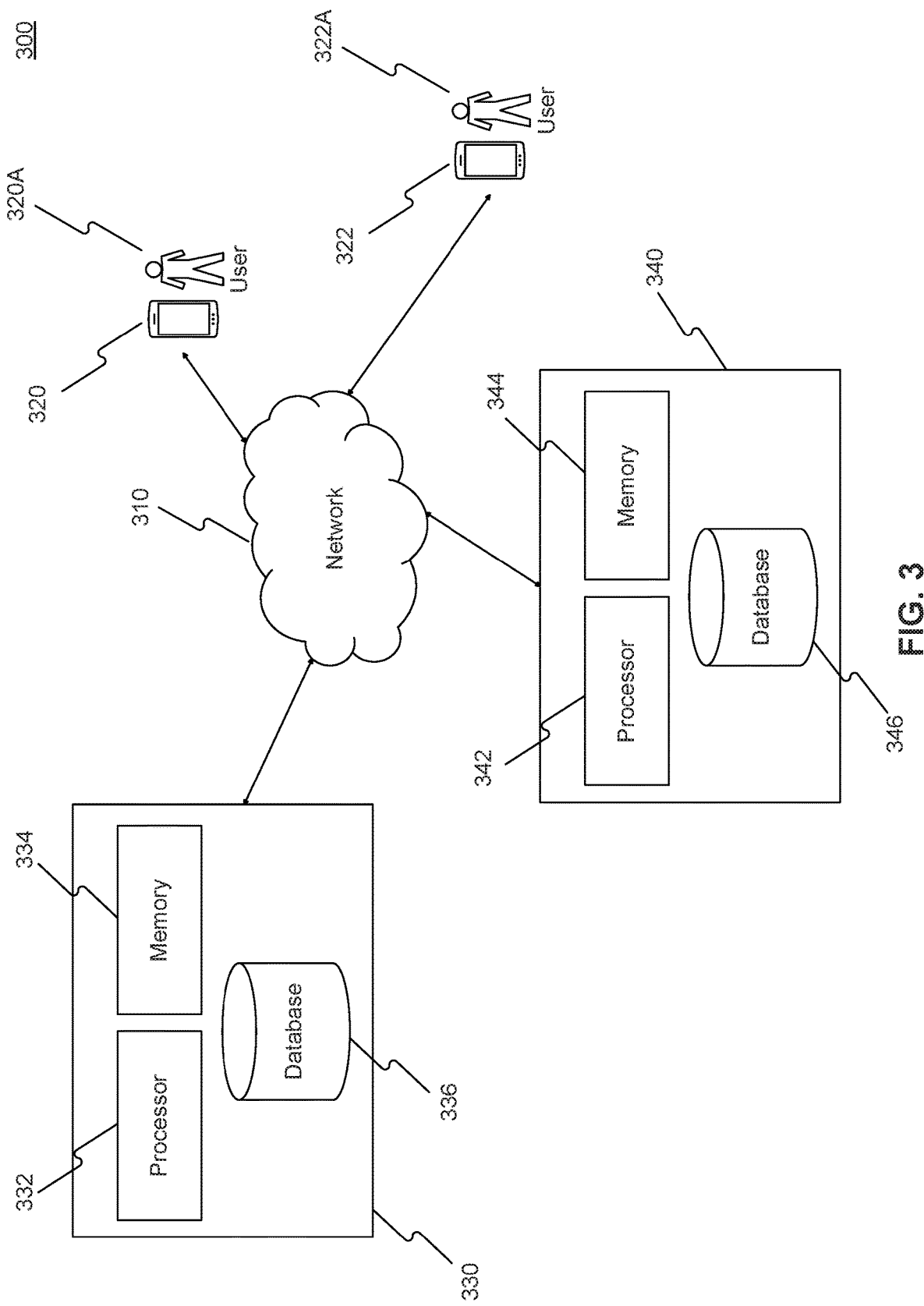
FIG. 3 depicts an exemplary network of devices and systems for fraud detection and user account deduplication, consistent with the disclosed embodiments.

Referring to FIG. 3, an exemplary network of devices and systems for fraud detection and user account deduplication is shown. As illustrated in FIG. 3, a system 300 may include an edge system 330 and a log system 340, each of which may communicate with a user device 320 associated with a user 320A or a user device 322 associated with a user 322A via a network 310. In some embodiments, edge system 330 and log system 340 may communicate with the other components of system 300 via a direct connection, for example, using a cable. In some other embodiments, system 300 may be a part of system 100 of FIG. 1A and may communicate with the other components of system 100 via network 310 or via a direct connection, for example, using a cable. Edge system 330 and log system 340 may each comprise a single computer or may each be configured as a distributed computer system including multiple computers that interoperate to perform one or more of the processes and functionalities associated with the disclosed examples.

As shown in FIG. 3, edge system 330 may comprise a processor 332, a memory 334, and a database 336. Log system 340 may comprise a processor 342, a memory 344, and a database 346. Processors 332 and 342 may be one or more known processing devices, such as a microprocessor from the Pentium™ family manufactured by Intel™ or the Turion™ family manufactured by AMD™. Processors 332 and 342 may constitute a single core or multiple core processor that executes parallel processes simultaneously. For example, processors 332 and 342 may use logical processors to simultaneously execute and control multiple processes. Processors 332 and 342 may implement virtual machine technologies or other known technologies to provide the ability to execute, control, run, manipulate, store, etc. multiple software processes, applications, programs, etc. In another example, processors 332 and 342 may include a multiple-core processor arrangement configured to provide parallel processing functionalities to allow edge system 330 and log system 340 to execute multiple processes simultaneously. One of ordinary skill in the art would understand that other types of processor arrangements could be implemented that provide for the capabilities disclosed herein.

Memories 334 and 344 may store one or more operating systems that perform known operating system functions when executed by processors 332 and 342, respectively. By way of example, the operating system may include Microsoft Windows, Unix, Linux, Android, Mac OS, iOS, or other types of operating systems. Accordingly, examples of the disclosed invention may operate and function with computer systems running any type of operating system. Memories 334 and 344 may be a volatile or non-volatile, magnetic, semiconductor, tape, optical, removable, non-removable, or other type of storage device or tangible computer readable medium.

Databases 336 and 346 may include, for example, Oracle™ databases, Sybase™ databases, or other relational databases or non-relational databases, such as Hadoop™ sequence files, HBase™, or Cassandra™. Databases 336 and 346 may include computing components (e.g., database management system, database server, etc.) configured to receive and process requests for data stored in memory devices of the database(s) and to provide data from the database(s). Databases 336 and 346 may include NoSQL databases such as HBase, MongoDB™ or Cassandra™. Alternatively, databases 336 and 346 may include relational databases such as Oracle, MySQL and Microsoft SQL Server. In some embodiments, databases 336 and 346 may take the form of servers, general purpose computers, mainframe computers, or any combination of these components.

Databases 336 and 346 may store data that may be used by processors 332 and 342, respectively, for performing methods and processes associated with disclosed examples. Databases 336 and 346 may be located in edge system 330 and log system 340, respectively, as shown in FIG. 3, or alternatively, they may be in external storage devices located outside of edge system 330 and log system 340. Data stored in 336 and 346 may include any suitable data associated with users (e.g., name, address, telephone number, e-mail address, IP address, computer identifier, social security number, birthday, credit card information, etc. for each user).

User devices 320 and 322 may be a tablet, mobile device, computer, or the like. User devices 320 and 322 may include a display. The display may include, for example, liquid crystal displays (LCD), light emitting diode screens (LED), organic light emitting diode screens (OLED), a touch screen, and other known display devices. The display may show various information to a user. For example, it may display the modified webpage that includes a modified user interface element, which includes an option to submit a request to register a new user account. User device 320 may include one or more input/output (I/O) devices. The I/O devices may include one or more devices that allow user devices 320 and 322 to send and receive information from users 320A and 322A or another device. The I/O devices may include various input/output devices, a camera, a microphone, a keyboard, a mouse-type device, a gesture sensor, an action sensor, a physical button, an oratory input, etc. The I/O devices may also include one or more communication modules (not shown) for sending and receiving information from edit system 330 or log system 340 by, for example, establishing wired or wireless connectivity between user devices 320 and 322 and network 310.

In some embodiments, users 320A or 322A may be internal users (e.g., employees of an organization that owns, operates, or leases systems 100 or 300). Internal front end system 105 may be implemented as a computer system that enables users 320A or 322A to interact with system 300. For example, in embodiments where systems 100 or 300 enable the presentation of systems to enable users to place an order for an item, internal front end system 105 may be implemented as a web server that enables users 320A or 322A to view diagnostic and statistical information about user accounts, modify user accounts, or review statistics relating to user accounts. In some embodiments, internal front end system 105 may run custom web server software designed to receive and process requests from systems or devices depicted in systems 100 or 300, acquire information from databases (e.g., databases 336 or 346) and other data stores based on those requests, and provide responses to the received requests based on acquired information.

For example, users 320A or 322A may submit a request to initialize databases 336 or 346 via internal front end system 105. Edge system 330 and log system 340 may receive the request to initialize databases 336 or 346, respectively, via internal front end system 105 over network 310. Edge system 330 may initialize database 336 by searching a plurality of edits in database 336. Each edit may include a user account identifier, at least one attribute, and a time entry. The user account identifier may be associated with a registered user account. An attribute may include, for example, a name, address, telephone number, e-mail address, IP address, computer identifier, social security number, birthday, or credit card information associated with a user. A time entry may include the time (e.g., month, day, year, hour, minutes, seconds, etc.) at which the associated user account was registered to systems 100 or 300. For each edit, edge system 330 may identify an attribute and identify pairs of edits that share the attribute. For each pair of edits that share an attribute, edge system 330 may create an entry that may be stored in database 336. Each entry stored in database 336 may include a pair of user account identifiers, an attribute that is shared by the pair of user account identifiers, and a pair of time entries associated with the user accounts. A plurality of entries may be created for pairs of edits that share more than one attribute. For example, if a pair of user accounts shares three attributes, then three different entries may be created, one entry for each of the attributes.

In some embodiments, creating each entry may include edge system 330 creating a table of entries stored in database 336 and indexing the table. For example, each row of the table may correspond to an entry in database 336. Each entry may include a pair of edits, where each edit includes a user account identifier, an attribute, and a time entry. A first column of the table may include a first edit of the entry and a second column of the table may include a second edit of the entry.

In some embodiments, log system 340 may initialize database 346 by searching a plurality of edits in database 346. Databases 336 and 346 may be linked so that the plurality of edits in databases 336 and 346 are the same. In some embodiments, databases 336 and 346 may be independent, but include the same plurality of edits. Each edit may include a user account identifier, at least one attribute, and a time entry. The user account identifier may be associated with a registered user account. An attribute may include, for example, a name, address, telephone number, e-mail address, IP address, computer identifier, social security number, birthday, or credit card information associated with a user. A time entry may include the time (e.g., month, day, year, hour, minutes, seconds, etc.) at which the associated user account was registered to systems 100 or 300. For each edit, log system 340 may create an entry that may be stored in database 346. Each entry stored in database 346 may include a user account identifier, an attribute, and a time entry associated with the user account.

In some embodiments, creating each entry may include log system 340 creating a table of entries stored in database 346 and indexing the table. For example, each row of the table may correspond to an entry in database 346. Each entry may include an edit, where each edit includes a user account identifier, an attribute, and a time entry.

In some embodiments, users 320A or 322A may be consumers. Users 320A or 322A may submit a request to register a user account via external front end system 103, which may be implemented as a web server that receives requests to register user accounts, search requests, presents item pages, and solicits payment information. External front end system 103 may run custom web server software designed to receive and process requests from external devices (e.g., user devices 320 or 322), acquire information from databases (e.g., databases 336 or 346), and other data stores based on those requests, and provide responses to the received requests based on acquired information. For example, users 320A or 322A may use user devices 320 or 322 to navigate to external front end system 103 and submit a request to register a user account by entering information into a submission box. External front end system 103 may request information from one or more systems in systems 100 or 300. For example, external front end system 103 may request information from edge system 330 or log system 340. Edge system 330 or log system 340 may receive the request to register a user account via external front end system 103 over network 310.

In some embodiments, the information entered by users 320A or 322A may include at least one attribute (e.g., name, address, telephone number, e-mail address, IP address, computer identifier, social security number, birthday, or credit card information associated with a user). System 300 may assign a category to the attributes. For example, system 300 may assign a first category to an attribute if the attribute comprises a telephone number, e-mail address, IP address, computer identifier, social security number, or credit card information. System 300 may assign a second category to an attribute if the attribute comprises a user's name, a user's address, or a birthday.

Edge system 330 or log system 340 may search indexed databases 336 or 346 based on the information received from users 320A or 322A. Because databases 336 and 346 are already indexed, system 330 or 340 may identify and retrieve entries that include attributes that match the attributes received from users 320A or 322A. For example, databases 336 and 346 may be initialized at a first time and the indexed databases 336 and 346 may be searched at a second time after the first time.

If the attributes of the retrieved entries from databases 336 or 346 include at least one attribute of a first category (e.g., telephone number, e-mail address, IP address, computer identifier, social security number, or credit card information), then system 300 may determine that the request to register a user account is a duplicate user account and deny the request. If the attributes of the retrieved entries from databases 336 or 346 includes a second category (e.g., user's name, a user's address, or a birthday), but no attributes of the first category, then system 300 may determine that the request to register a user account is an authentic request to register a new user account and approve the request. System 300 may send a notification to users 320A or 322A indicating the registration status of the user's requested user account.

Edge system 330 or log system 340 may record the time at which users 320A or 322A submit a request and the time at which the request is approved and the new user accounts are registered. Edge system 330 or log system 340 may assign a user account identifier to users 320A or 322A.

Systems 330 and 340 may add a new edit to databases 336 and 346 that includes the user account identifier of an approved request to register, at least one attribute, and a time entry of the time at which the user account of the approved request was registered to systems 100 or 300. Edge system 330 may create new entries, including pairs of edits, by adding new rows to the table of database 336 and indexing the new rows. Each new entry may include the new edit and an edit of the retrieved entries. Each new entry may include a pair of user account identifiers, an attribute that is shared by the pair of user account identifiers, and a pair of time entries associated with the user accounts.

Log system 340 may create a new entry, including the new edit, by adding a new row to the table of database 346 and indexing the new row. The new entry may include the new user account identifier, at least one attribute, and a time entry.

Databases 336 and 346 may be initialized at a first time and the indexed databases 336 and 346 may be searched at a second time after the first time. Databases 336 and 346 may only be initialized once so that subsequent requests to register user accounts may be processed with a low computation load. For example, initialized databases 336 and 346 may require a quadratic complexity while processing each request after initialization may only require a linear complexity since the approved requests received after initialization may be added to the tables of databases 336 and 346 without re-indexing the existing entries in the databases.

In some embodiments, users 320A or 322A may be consumers who use user devices 320 or 322 to select a product from the SRP, e.g., by clicking or tapping a user interface, or using another input device, to select a product represented on the SRP. User device 320 or 322 may formulate a request for information on the selected product and send it to external front end system 103. In response, external front end system 103 may send user account information associated with users 320A or 322A to and request information related to the user account of users 320A or 322A from system 300. Edge system 330 or log system 340 may receive the user account information and identify at least one attribute included in the user account information. Edge system 330 or log system 340 may search indexed databases 336 or 346 to retrieve entries that include attributes that match the received attributes.

If the attributes of the retrieved entries from databases 336 or 346 include at least one attribute of a first category (e.g., telephone number, e-mail address, IP address, computer identifier, social security number, or credit card information), then system 300 may determine that the user account interacting with the SRP is a duplicate user account, remove entries associated with the user account from databases 336 and 346, and ban the user associated with the removed user account. For example, system 300 may ban the user associated with the removed user account by blocking requests from the IP address associated with the user. If the attributes of the retrieved entries from databases 336 or 346 include a second category (e.g., user's name, a user's address, or a birthday), but no attributes of the first category, then system 300 may determine that the user account interacting with the SRP is an authentic user account and allow the user to proceed with interacting with the SRP.

In some embodiments, system 300 may determine whether user accounts interacting with a SDP or any other user interface element (e.g., a button that reads "Buy Now," webpages associated with purchasing of products, etc.) are authentic user accounts in a process similar to the process described above in order to deduplicate registered user accounts or remove and ban fraudulent user accounts with a low computation load.

Figure 4:
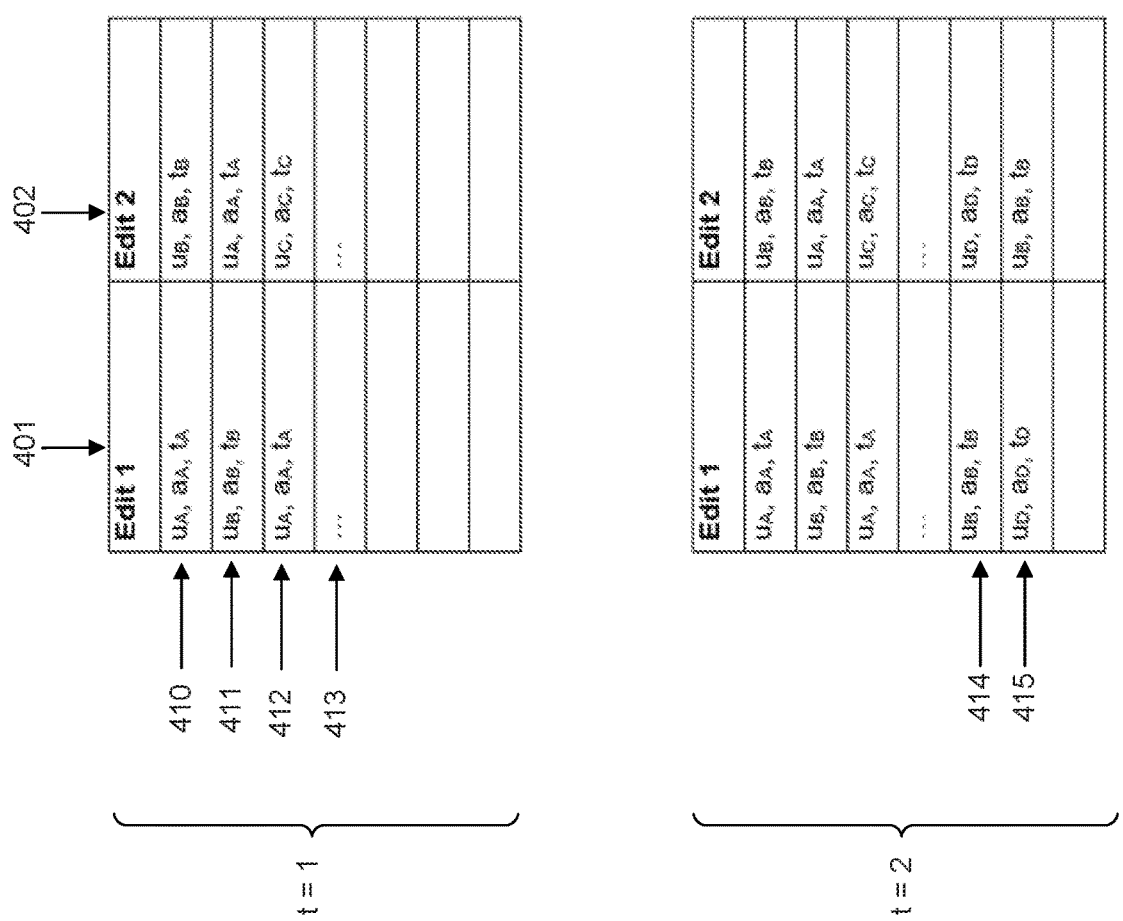
FIG. 4 depicts an exemplary table of a database for fraud detection and user account deduplication, consistent with the disclosed embodiments.

Referring to FIG. 4, an exemplary table of a database for fraud detection and user account deduplication is shown. As illustrated in FIG. 4, database 336 may include a table 400. Edge system 330 may initialize database 336 by creating rows of entries 410, 411, 412, and 413. Each entry may include a pair of columns that include edits 401 and 402. Each edit may be associated with a different user. For example, entry 410 may include users A and B, entry 411 may include users B and A, and entry 412 may include users A and C. Each edit may include a user account identifier "u", an attribute "a" shared by the pair of user account identifiers, and a time entry "t" associated with the user account. A plurality of entries may be created for pairs of edits that share more than one attribute. In some embodiments, entries 410 and 411 may include the same users A and B and their associated user account identifiers, attributes, and time entries. Entry 410 may include user A in edit 401 and user B in edit 402 while entry 411 may include user B in edit 401 and user A in edit 402. This organization of entries may allow edge system 330 to efficiently retrieve edits (e.g., edits 402) associated with a user (e.g., user A) by searching edits in a single column (e.g., edits 401). For example, edge system 330 may search edits 401 to determine that users B and C are associated with user A or to determine that user A is associated with user B.

In some embodiments, database 336 may be initialized at a first time t=1 and new entries may be added to database 336 at a second time t=2. For example, at time t=2 edge system 330 may search indexed database 336 based on information received from users 320A or 322A. Because database 336 is already indexed, system 330 may identify and retrieve at least one of entries 410, 411, 412, or 413 if they include attributes that match the attributes received from users 320A or 322A.

System 330 may add a new edit to database 336 that includes the user account identifier of an approved request to register, at least one attribute, and a time entry of the time at which the user account of the approved request was registered to systems 100 or 300. Edge system 330 may create new entries, including pairs of edits, by adding new rows to the table of database 336 and indexing the new rows. For example, new entries 414 and 415 may be added to table 400 at t=2. Each new entry may include the new edit and an edit of the retrieved entries. For example, user D may be associated with a newly registered user account while user B is associated with a retrieved entry that was already indexed at t=1. Each new entry may include a pair of user account identifiers, an attribute that is shared by the pair of user account identifiers, and a pair of time entries associated with the user accounts.

Database 336 may be initialized at t=1 and the indexed database 336 may be searched at t=2 after t=1. Database 336 may only be initialized once so that subsequent requests to register user accounts may be processed with a low computation load. For example, initialized database 336 may require a quadratic complexity at t=1 while processing each request after initialization may only require a linear complexity at t=2 since the approved requests received after initialization may be added to table 400 without re-indexing the existing entries in the database.

Figure 5:
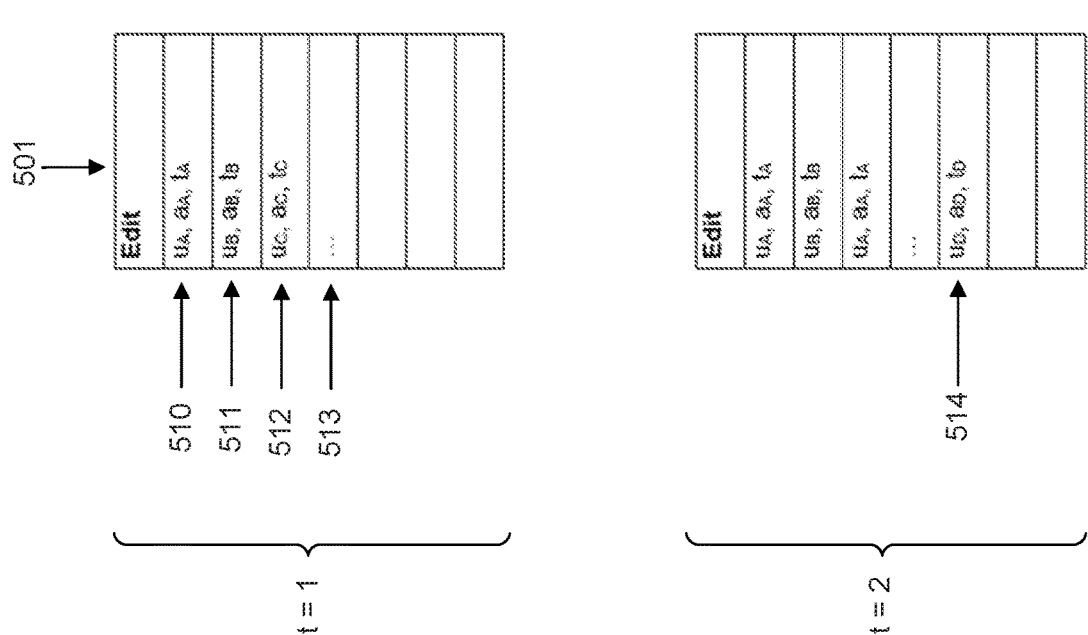
FIG. 5 depicts an exemplary table of a database for fraud detection and user account deduplication, consistent with the disclosed embodiments.

Referring to FIG. 5, an exemplary table of a database for fraud detection and user account deduplication is shown. As illustrated in FIG. 5, database 346 may include a table 500. Log system 340 may initialize database 346 by creating rows of entries 510, 511, 512, and 513. Each entry may include a column that includes edit 501. Each edit may be associated with a different user. For example, entry 510 may include user A, entry 511 may include user B, and entry 512 may include user C. Each edit may include a user account identifier "u", an attribute "a" shared by the pair of user account identifiers, and a time entry "t" associated with the user account.

In some embodiments, database 346 may be initialized at a first time t=1 and new entries may be added to database 346 at a second time t=2. For example, at time t=2 log system 340 may search indexed database 346 based on information received from users 320A or 322A. Because database 346 is already indexed, system 340 may identify and retrieve at least one of entries 510, 511, 512, or 513 if they include attributes that match the attributes received from users 320A or 322A.

System 340 may add a new edit to database 346 that includes the user account identifier of an approved request to register, at least one attribute, and a time entry of the time at which the user account of the approved request was registered to systems 100 or 300. Log system 340 may create new entries by adding new rows to the table of database 346 and indexing the new rows. For example, new entry 514 may be added to table 500 at t=2. Each new entry may include the new edit. For example, user D may be associated with a newly registered user account. Each new entry may include a user account identifier, an attribute, and a time entry associated with the user account.

Database 346 may be initialized at t=1 and the indexed database 346 may be searched at t=2 after t=1. Database 346 may only be initialized once so that subsequent requests to register user accounts may be processed with a low computation load. For example, initialized database 346 may require a quadratic complexity at t=1 while processing each request after initialization may only require a linear complexity at t=2 since the approved requests received after initialization may be added to table 500 without re-indexing the existing entries in the database.

Figure 6:
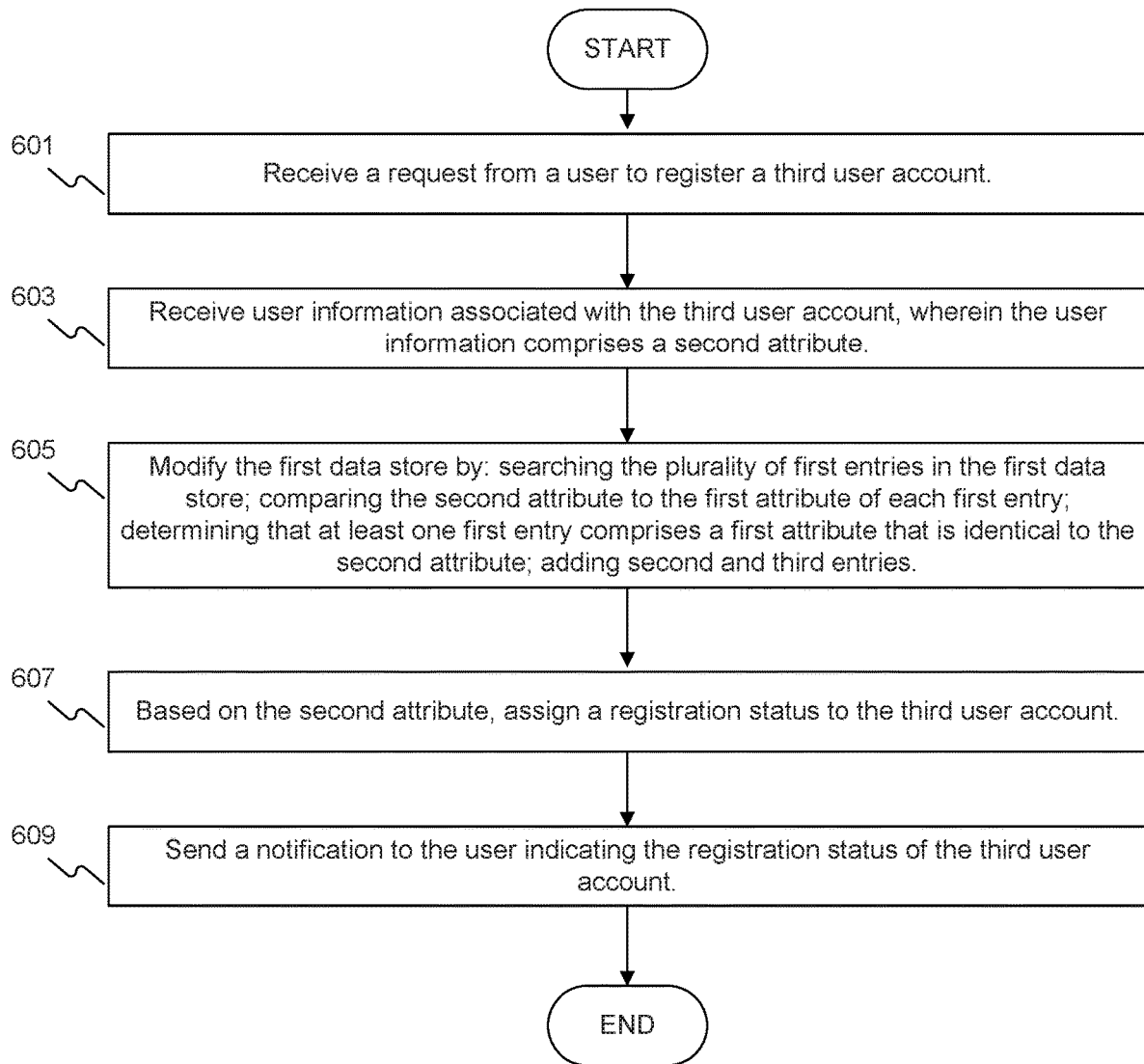
FIG. 6 depicts a process for fraud detection and user account deduplication, consistent with the disclosed embodiments.

Referring to FIG. 6, a process for fraud detection and user account deduplication is shown. While in some embodiments edge system 330 may perform several of the steps described herein, other implementations are possible. For example, any of the systems and components (e.g., system 100, log system 340, etc.) described and illustrated herein may perform the steps described in this disclosure.

In step 601, edge system 330 may receive a request from users 320A or 322A to register a third user account via external front end system 103 over network 310. Users 320A or 322A may submit a request to register the third user account via external front end system 103, which may be implemented as a web server that receives requests to register user accounts, search requests, presents item pages, and solicits payment information. External front end system 103 may run custom web server software designed to receive and process requests from external devices (e.g., user devices 320 or 322). For example, users 320A or 322A may use user devices 320 or 322 to navigate to external front end system 103 and submit a request to register a user account by entering information into a submission box. Database 336 may include a plurality of first entries, wherein each first entry comprises a pair of first and second user accounts, at least one first attribute that is shared between the pair of first and second user accounts, and first and second time entries.

In step 603, edge system 330 may receive user information associated with the third user account of the request, wherein the user information comprises a second attribute. The second attribute may include a name, address, telephone number, e-mail address, IP address, computer identifier, social security number, birthday, or credit card information associated with the user. In some embodiments, system 300 may assign a first category to an attribute if the attribute comprises a telephone number, e-mail address, IP address, computer identifier, social security number, or credit card information or a second category to an attribute if the attribute comprises a user's name, a user's address, or a birthday.

In step 605, edge system 330 may, at a third time entry, modify the first data store by: searching the plurality of first entries in the first data store; comparing the second attribute to the first attribute of each first entry; determining that at least one first entry comprises a first attribute that is identical to the second attribute; adding second and third entries, wherein the second entry comprises the first and third user accounts, the second attribute, and the first and third time entries; and the third entry comprises the second and third user accounts, the second attribute, and the second and third time entries. Edge system 330 may search indexed database 336 based on the information received from users 320A or 322A. Because database 336 is already indexed, system 330 may identify and retrieve entries that include attributes that match the attributes received from users 320A or 322A. For example, database 336 may be initialized at a first time and the indexed database 336 may be searched at a second time after the first time. If the attributes of the retrieved entries from database 336 include a second category (e.g., user's name, a user's address, or a birthday), but no attributes of a first category (e.g., telephone number, e-mail address, IP address, computer identifier, social security number, or credit card information), then system 300 may determine that the request to register a user account is an authentic request to register a new user account and approve the request.

System 330 may add a new edit to database 336 that includes the user account identifier of an approved request to register, at least one attribute, and a time entry of the time at which the user account of the approved request was registered to systems 100 or 300. Edge system 330 may create new entries, including pairs of edits, by adding new rows to the table of database 336 and indexing the new rows. Each new entry may include the new edit and an edit of the retrieved entries. Each new entry may include a pair of user account identifiers, an attribute that is shared by the pair of user account identifiers, and a pair of time entries associated with the user accounts.

In step 607, system 330 may, based on the second attribute, assign a registration status to the third user account. For example, if the attributes of the retrieved entries from database 336 include a second category (e.g., user's name, a user's address, or a birthday), but no attributes of a first category (e.g., telephone number, e-mail address, IP address, computer identifier, social security number, or credit card information), then system 300 may determine that the request to register a user account is an authentic request to register a new user account and approve the request. If the attributes of the retrieved entries from databases 336 or 346 include at least one attribute of the first category, then system 300 may determine that the user account interacting with the SRP is a duplicate user account, remove entries associated with the user account from databases 336 and 346, and ban the user associated with the removed user account. For example, system 300 may ban the user associated with the removed user account by blocking requests from the IP address associated with the user.

In step 609, system 330 may send a notification to the user indicating the registration status of the third user account.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/ AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for fraud detection and user account deduplication, comprising:
   a first data store comprising a first plurality of entries, wherein each entry of the first plurality of entries comprises a pair of user accounts, at least one attribute that is shared between the pair of user accounts, and a pair of time entries, and
   at least one entry of the first plurality of entries comprises a pair of non-fraudulent user accounts;
   wherein the first plurality of entries comprise a first entry and the first entry comprises a pair of first and second user accounts, at least one first attribute that is shared between the pair of first and second user accounts, and first and second time entries;
   a second data store comprising a second plurality of entries, wherein each entry of the second plurality of entries comprises a user account, at least one attribute, and a time entry,
   wherein the second plurality of entries comprises a fourth entry and the fourth entry comprises a fourth user account, at least one third attribute, and a fourth time entry;
   a memory storing instructions; and
   at least one processor configured to execute the instructions to:
      receive a request from a user device via a network to register a third user account;
      receive user information associated with the third user account via the network, wherein the user information comprises a second attribute;

at a third time entry, modify the first data store by:
searching the first plurality of entries in the first data store;
comparing the second attribute to the attributes of the first plurality of entries;
determining that at least one first attribute is identical to the second attribute;
adding second and third entries, wherein
the second entry comprises the first and third user accounts, the second attribute, and the first and third time entries; and
the third entry comprises the second and third user accounts, the second attribute, and the second and third time entries;
based on the second attribute, determine that the third user account is a duplicate user account;
ban the third user account;
send a notification to the user device via the network indicating that the third user account is banned;
modify the second data store by indexing a table, wherein the table comprises a plurality of rows corresponding to the second plurality of entries; and
modify the second data store by adding a first row comprising the third user account, the second attribute, and the third time entry;
wherein the first data store is initialized once at a time before the third time entry and initializing the first data store comprises:
searching the second plurality of entries in the second data store;
comparing each attribute of the second plurality of entries; and
identifying pairs of user accounts of the second plurality of entries that have identical attributes;
such that a computation load of modifying the first data store at the third time entry is lower than a computation load of initializing the first data store.

2. The system of claim 1, wherein the first and second attributes comprise at least one of a telephone number, e-mail address, IP address, computer identifier, or social security number.

3. The system of claim 1, wherein modifying the first data store comprises indexing a table and each row of the table comprises an entry of the first plurality of entries and modifying the first data store comprises adding a first row comprising the second entry and adding a second row comprising the third entry.

4. The system of claim 1, wherein the instructions further comprise:
receiving a second request from a second user device via the network to register a fourth user account;
receiving user information associated with the fourth user account via the network, wherein the user information comprises a third attribute;
at a fourth time entry, modifying the first data store by:
searching the first plurality of entries in the first data store;
comparing the third attribute to the attribute of each entry of the first plurality of entries and the second attribute of the second and third entries;
if the third attribute is identical to the second tribute, adding fourth, fifth, and sixth entries, wherein
the fourth entry comprises the first and fourth user accounts, the third attribute, and the first and fourth time entries;
the fifth entry comprises the second and fourth user accounts, the third attribute, and the second and fourth time entries; and
the sixth entry comprises the third and fourth user accounts, the third attribute, and the third and fourth time entries;
based on the third attribute, assigning a registration status to the fourth user account; and
sending a notification to the second user device indicating the registration status of the fourth user account.

5. The system of claim 1, wherein each entry of the first plurality of entries comprises the identified pair of user accounts of the second plurality of entries.

6. The system of claim 1, wherein only the second attribute is compared to the attribute of each entry of the first plurality of entries at the third time entry.

7. A method for fraud detection and user account deduplication, comprising:
a first data store comprising a first plurality of entries, wherein each entry of the first plurality of entries comprises a pair of user accounts, at least one attribute that is shared between the pair of user accounts, and a pair of time entries, and
at least one entry of the first plurality of entries comprises a pair of non-fraudulent user accounts;
wherein the first plurality of entries comprises a first entry and the first entry comprises a pair of first and second user accounts, at least one first attribute that is shared between the pair of first and second user accounts, and first and second time entries;
a second data store comprising a second plurality of entries, wherein each entry of the second plurality of entries comprises a user account, at least one attribute, and a time entry,
wherein the second plurality of entries comprises a fourth entry and the fourth entry comprises a fourth user account, at least one third attribute, and a fourth time entry;
receiving a request from a user device via a network to register a third user account;
receiving user information associated with the third user account via the network, wherein the user information comprises a second attribute;
at a third time entry, modifying the first data store by:
searching the first plurality of entries in the first data store;
comparing the second attribute to the attributes of the first plurality of entries;
determining that at least one first attribute is identical to the second attribute;
adding second and third entries, wherein
the second entry comprises the first and third user accounts, the second attribute, and the first and third time entries; and
the third entry comprises the second and third user accounts, the second attribute, and the second and third time entries;
based on the second attribute, determining that the third user account is a duplicate user account;
banning the third user account;
sending a notification to the user device via the network indicating that the third user account is banned;
modifying the second data store by indexing a table, wherein the table comprises a plurality of rows corresponding to the second plurality of entries; and modifying the second data store by adding a first row comprising the third user account, the second attribute, and the third time entry;
wherein the first data store is initialized once at a time before the third time entry and initializing the first data store comprises:
searching the second plurality of entries in the second data store;
comparing each attribute of the second plurality of entries; and
identifying pairs of user accounts of the second plurality of entries that have identical attributes;
such that a computation load of modifying the first data store at the third time entry is lower than a computation load of initializing the first data store.

8. The method of claim 7, wherein the first and second attributes comprise at least one of a telephone number, e-mail address, IP address, computer identifier, or social security number.

9. The method of claim 7, wherein modifying the first data store comprises indexing a table and each row of the table comprises an entry of the first plurality of entries and modifying the first data store comprises adding a first row comprising the second entry and adding a second row comprising the third entry.

10. The method of claim 7, further comprising:
receiving a second request from a second user device via the network to register a fourth user account;
receiving user information associated with the fourth user account via the network, wherein the user information comprises a third attribute;
at a fourth time entry, modifying the first data store by:
searching the first plurality of entries in the first data store;
comparing the third attribute to the attribute of each entry of the first plurality of entries and the second attribute of the second and third entries;
if the third attribute is identical to the second tribute, adding fourth, fifth, and sixth entries, wherein
the fourth entry comprises the first and fourth user accounts, the third attribute, and the first and fourth time entries;
the fifth entry comprises the second and fourth user accounts, the third attribute, and the second and fourth time entries; and
the sixth entry comprises the third and fourth user accounts, the third attribute, and the third and fourth time entries;
based on the third attribute, assigning a registration status to the fourth user account; and
sending a notification to the second user device indicating the registration status of the fourth user account.

11. The method of claim 7, wherein each entry of the first plurality of entries comprises the identified pair of user accounts of the second plurality of entries.

12. The method of claim 7, wherein only the second attribute is compared to the attribute of each entry of the first plurality of entries at the third time entry.

13. A computer-implemented system for fraud detection and user account deduplication, comprising:
a first data store comprising a plurality of entries, wherein each entry of the first plurality of entries comprises a pair of user accounts, at least one attribute that is shared between the pair of user accounts, and a pair of time entries, and
at least one entry of the first plurality of entries comprises a pair of non-fraudulent user accounts;
wherein the first plurality of entries comprises a first entry and the first entry comprises a pair of first and second user accounts, at least one first attribute that is shared between the pair of first and second user accounts, and first and second time entries;
a second data store comprising a second plurality of entries, wherein each entry of the second plurality of entries comprises a pair of user accounts, at least one attribute that is shared between the pair of user accounts, and a pair of time entries,
wherein the second plurality of entries comprises a fourth entry and the fourth entry comprises a fourth user account, at least one third attribute, and a fourth time entry;
a memory storing instructions; and
at least one processor configured to execute the instructions to:
receive a request from a user device via a network to register a third user account;
receive user information associated with the third user account via the network, wherein the user information comprises a second attribute;
at a third time entry, modify the first data store by:
searching the first plurality of entries in the first data store;
comparing the second attribute to the attributes of the first plurality of entries;
determining that at least one first attribute is identical to the second attribute;
adding second and third entries, wherein
the second entry comprises the first and third user accounts, the second attribute, and the first and third time entries; and
the third entry comprises the second and third user accounts, the second attribute, and the second and third time entries; and
modify the second data store by indexing a table, wherein the table comprises a plurality of rows corresponding to the second plurality of entries;
modify the second data store by adding a first row comprising the third user account, the second attribute, and the third time entry;
wherein the first data store is initialized once at a time before the third time entry and initializing the first data store comprises:
searching the second plurality of entries in the second data store;
comparing each attribute of the second plurality of entries; and
identifying pairs of user accounts of the second plurality of entries that have identical attributes;
such that a computation load of modifying the first data store at the third time entry is lower than a computation load of initializing the first data store:
categorize the first and second attributes into first and second types of attributes;
if the first and second attributes are categorized as the first type of attribute, then determine that the third user account is registered;
if the first and second attributes are categorized as the second type of attribute, then determine that the third user account is not registered and ban the third user account; and
send a notification to the user device via the network indicating a registration status of the third user account.

14. The system of claim 13, wherein:
the first type of attribute comprises at least one of a telephone number, e-mail address, IP address, computer identifier, or social security number; and
the second type of attribute comprises at least one of a user's name, a user's address, or birthday.

\* \* \* \* \*